(12) United States Patent
Collette et al.

(10) Patent No.: US 7,097,269 B2
(45) Date of Patent: Aug. 29, 2006

(54) PROOFING HEAD AND PROOFER PRINTER APPARATUS

(75) Inventors: Robert P. Collette, Pavilion, NY (US); Thomas J. Kalkbrenner, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 955 days.

(21) Appl. No.: 09/736,049

(22) Filed: Dec. 13, 2000

(65) Prior Publication Data

US 2002/0080373 A1 Jun. 27, 2002

(51) Int. Cl.
*B41J 29/393* (2006.01)
*G06F 15/00* (2006.01)
*B41F 7/02* (2006.01)

(52) U.S. Cl. .................... 347/19; 358/1.9; 101/218
(58) Field of Classification Search ............... 358/201, 358/1.9; 347/256, 19, 240, 43, 37.19; 101/218, 101/145
See application file for complete search history.

(56) References Cited

U.S. PATENT DOCUMENTS

| | | | |
|---|---|---|---|
| 4,700,238 A | 10/1987 | Sugiyama | |
| 4,775,877 A | 10/1988 | Kosugi et al. | |
| 4,809,080 A | 2/1989 | Kotani et al. | |
| 4,839,741 A | 6/1989 | Wilson | |
| 5,047,870 A | 9/1991 | Filo | |
| 5,049,999 A | 9/1991 | Stemmle | |
| 5,053,866 A | 10/1991 | Johnson | |
| 5,070,410 A | 12/1991 | Hadley | |
| 5,162,916 A | 11/1992 | Stemmle et al. | |
| 5,267,056 A | 11/1993 | Stemmle | |
| 5,491,568 A | 2/1996 | Wan | |
| 5,532,825 A | 7/1996 | Lim et al. | |
| 5,625,378 A | 4/1997 | Wan et al. | |
| 5,682,253 A | 10/1997 | Sakamoto et al. | |
| 5,760,799 A | 6/1998 | Inui et al. | |
| 5,812,172 A | 9/1998 | Yamada | |
| 5,926,283 A | 7/1999 | Hopkins | |
| 6,086,274 A | 7/2000 | Krzyminski | |
| 6,163,389 A | 12/2000 | Buhr et al. | |
| 6,366,306 B1 | 4/2002 | Fukuda | |
| 6,404,511 B1 | 6/2002 | Lin et al. | |
| 6,431,679 B1 * | 8/2002 | Li et al. ...................... 347/19 |
| 6,710,796 B1 * | 3/2004 | Miyazaki et al. ........... 347/256 |
| 2004/0085378 A1 | 5/2004 | Sievert et al. | |

FOREIGN PATENT DOCUMENTS

| | | |
|---|---|---|
| DE | 199 22 718 A1 | 12/1999 |
| EP | 0 680 198 A | 11/1995 |
| EP | 1 103 799 A | 5/2001 |

* cited by examiner

*Primary Examiner*—Kimberly Williams
*Assistant Examiner*—Saeid Ebrahimi-Dehkordy
(74) *Attorney, Agent, or Firm*—Roland R. Schindler, II (57) ABSTRACT

The present invention discloses a proofing head apparatus and a proofing printer for generating a proof. The proofing head assembly comprises a color light analyzer and a color printhead joined by a housing to align the color light analyzer and to direct both the printhead and the color light analyzer at a media. In certain embodiments a controller is provided to drive the color light analyzer to make color measurements of an image and to instruct the printhead to render images on a receiver media. The controller can adjust the colors printed by the printhead so that an image printed by the printhead will match the appearance of the same image as printed by another printer. The proofing printer assembly of the present invention incorporates the proofing head with a media advance and translation mechanism.

24 Claims, 6 Drawing Sheets

PROOFING HEAD AND PROOFER PRINTER APPARATUS

FIELD OF THE INVENTION

This invention relates to image proofing systems, more particularly to a proofing apparatus and a proofing head assembly used to prepare color correct samples of printed materials.

BACKGROUND OF THE INVENTION

In the printing industry, it is common to provide a sample of an image to the customer for approval prior to printing a large number of copies of the image using a high volume output device such as a printing press. The sample image is known as a "proof". The proof is used to ensure that the consumer is satisfied with the contents, composition and color gamut and tone characteristics of the image.

It is not, however, cost effective to print the proof using high volume output devices of the type used to print large quantities of the image. This is because it is expensive to set up high volume output devices to print an image. Accordingly, it has become the practice in the printing industry to use digital color printers to print proofs. Digital color printers render color prints of images that have been encoded in the form of digital data. This data includes code values indicating the colors to be printed in an image. When the color printer generates the printed output of an image, it is intended that the image recorded on the printed output will contain the exact colors called for by the code values in the digitally encoded data.

In practice, it has been found that the colors in the images printed by digital color printers do not always match the colors printed by high volume output devices. One reason for this is that variations in ink, paper and printing conditions can cause a digital color printer to generate images with colors that do not match the colors produced by a high volume output device using the same values. Therefore, a proof printed by a digital color printer may not have colors that match the colors that will be printed by the high volume output device.

Accordingly, digital color printers have been developed that can be color adjusted so that they can mimic the performance of high volume output devices. Such adjustable color printers are known in the industry as "proofers". Two types of adjustments are commonly applied to cause proofers to produce visually accurate proofs of an image: color calibration adjustments and color management adjustments.

Color calibration adjustments are used to modify the operation of the proofer so that the proofer prints the colors called for in the code values of the images to be printed by the proofer. These adjustments are necessary to compensate for the variations in ink, paper and printing conditions that can cause the colors printed by the proofer to vary from the colors called for in the code values. To determine what color calibration adjustments must be made, it is necessary to determine how the proofer translates code values into colors on a printed image. This is done by asking the proofer to print a calibration test image. The calibration test image consists of a number of color patches. Each color patch contains the color printed by the proofer in response to a particular code value. The stand-alone calibration device measures the colors in the test image. The color of each color patch is compared to code values associated with that patch and the comparisons are used to determine what adjustments must be made to the proofer to cause the proofer to print desired colors in response to particular color code values.

Color management adjustments are used to modify the operation of the proofer so that an image printed by the proofer will have an appearance that matches the appearance of the same image as printed by a high volume output device. The first step in color management is to determine how the high volume output device converts color code values into printed colors. This is known as characterization. To characterize a high volume output device it is necessary to obtain a characterization test image. The characterization test image can be printed by the high volume output device. However, if it is known that the high volume output device converts code values into printed colors in accordance with an industry standard proofing system such as MatchPrint ™ or Cromalin ™, then a test image printed in accordance with that standard can be used for characterization purposes.

In either case, the characterization test image is submitted to the stand-alone color management device. The color patches on the characterization test image are compared to the color code values associated with the patches. This comparison is used to determine the adjustments that must be made to cause the proofer to print images having the same color gamut and tone characteristics as the images printed by the high volume output device. The proofer is then adjusted accordingly.

In this manner, the proofer is adjusted so that the proofer is properly calibrated to render images having the colors called for in the code values in the image to be proofed and is also adjusted to modify the code values in the image to be proofed in accordance with the profile for the output device. Thus, the proofer renders images having the colors that will appear the same as the colors in the images printed by output device.

It will be recognized that both calibration adjustments and color management adjustments are based upon objective measurements of the color gamut and tone characteristics of the test images printed by the proofer and by the high volume output device.

Various devices are used to measure the color content of an image. The most common devices are the densitometer and the color scanner. These devices typically analyze the color content of the light reflected by an image by dividing light into a set of primary colors, such as red, green and blue. These devices divide light into primary colors by passing the light through a set of colored filters. By measuring the intensity of the light in each primary color, it is possible to objectively measure the color content of an image.

A special form of densitometer, the colorimeter, can also be used to objectively measure the color gamut and tone characteristics of an image. Colorimeters are designed to objectively measure the color of a sample in a way that approximates human visual response. This is accomplished by the use of filters that are chosen to mimic human visual response.

A more accurate device for measuring color for calibration and color management purposes is the spectrophotometer. The spectrophotometer measures the reflectance or transmittance of an object at a number of wavelengths throughout the visible spectrum. More specifically, a spectrophotometer exposes a test image to a known light source and then analyzes the light that is reflected by the test image to determine the spectral intensity of the sample. A typical spectrophotometer is capable of measuring a group of pixels in an image and includes an apparatus that measures the light that is reflected by a portion of an image at a number of wavelengths throughout the visible spectrum to obtain data that reflects the true spectral content of the reflected light. Because the spectrophotometer measures color with greater accuracy than do the other measurement devices discussed above, the spectrophotometer is preferred.

Thus, densitometers, colorimeters, color scanners, and spectrophotometers can be used for color measurement. However, these are typically stand-alone devices and the use of such devices during proofing is very costly. Part of this cost is created by the inherent redundancy of many of the systems used in these devices. For example, a stand-alone spectrophotometer, has an "X-Y" table to move the test image relative to the spectrophotometer. A digital color printer or proofer also contains an "X-Y" displacement mechanism for moving the paper and printing element or printhead. Similarly, both the spectrophotometer and the proofer contain separate electrical control systems, motors and other components. Thus, the total cost of the proofing system including a separate stand-alone color measurement device and a proofer is high and can be in excess of more than U.S. $10,000.00.

Installation and maintenance costs are also high because two separate devices, typically manufactured by different vendors, must be separately purchased, installed, and maintained. Finally, there is a significant labor cost associated with making calibration and color management adjustments to the proofer using a stand-alone color measurement device.

Accordingly, there are substantial cost and efficiency penalties associated with stand-alone proofing combinations and what is needed is an integrated proofing apparatus.

Special printers having integrated color scanners or densitometers for color calibration purposes exist. Examples of color calibration and correction systems of this type can be found in commonly assigned U.S. Pat. Nos. 5,053,866, and 5,491,586. These patents show specially designed printing systems for generating a color image and adjusting the color content of subsequent images based upon the colors printed in the color image. However, these specially designed systems also use redundant structures for printing and color measurement and do not teach or suggest color management capabilities.

It will also be recognized that many high quality color digital printers exist. However, these printers are not designed with integral proofing capabilities. Thus, what is also needed is a proofing head having calibration and color management capabilities and that can be readily integrated into an existing printer.

Accordingly, it is an object of the present invention to provide a proofer that is low in cost and is easily maintained.

It is also an object to provide a proofer that substantially automates the proofing process.

It is also an object of the present invention to provide a proofing head that can be readily incorporated into a printer of conventional design to permit the printer to act as a proofer.

SUMMARY OF THE INVENTION

The present invention resides in a proofing printer for generating a proof and a proofing head assembly. The proofing head assembly comprises a color light analyzer and a color printhead joined by a housing that directs the color light analyzer and the printhead at a media. A controller is provided to drive the color light analyzer to make color measurements of an image and to instruct the printhead to render images on a receiver media. The controller can adjust the colors printed by the printhead so that an image printed by the printhead will match the appearance of the same image as printed by another output device. The proofing printer assembly of the present invention combines the proofing head with a media advance and translation mechanism. Certain embodiments of the proofing printer self-calibrate and automatically characterize another output device. One embodiment of the proofing head of the present invention is adapted to be incorporated into color printers without color calibration and color management capabilities.

DETAILED DESCRIPTION OF THE INVENTION

Figure 1:
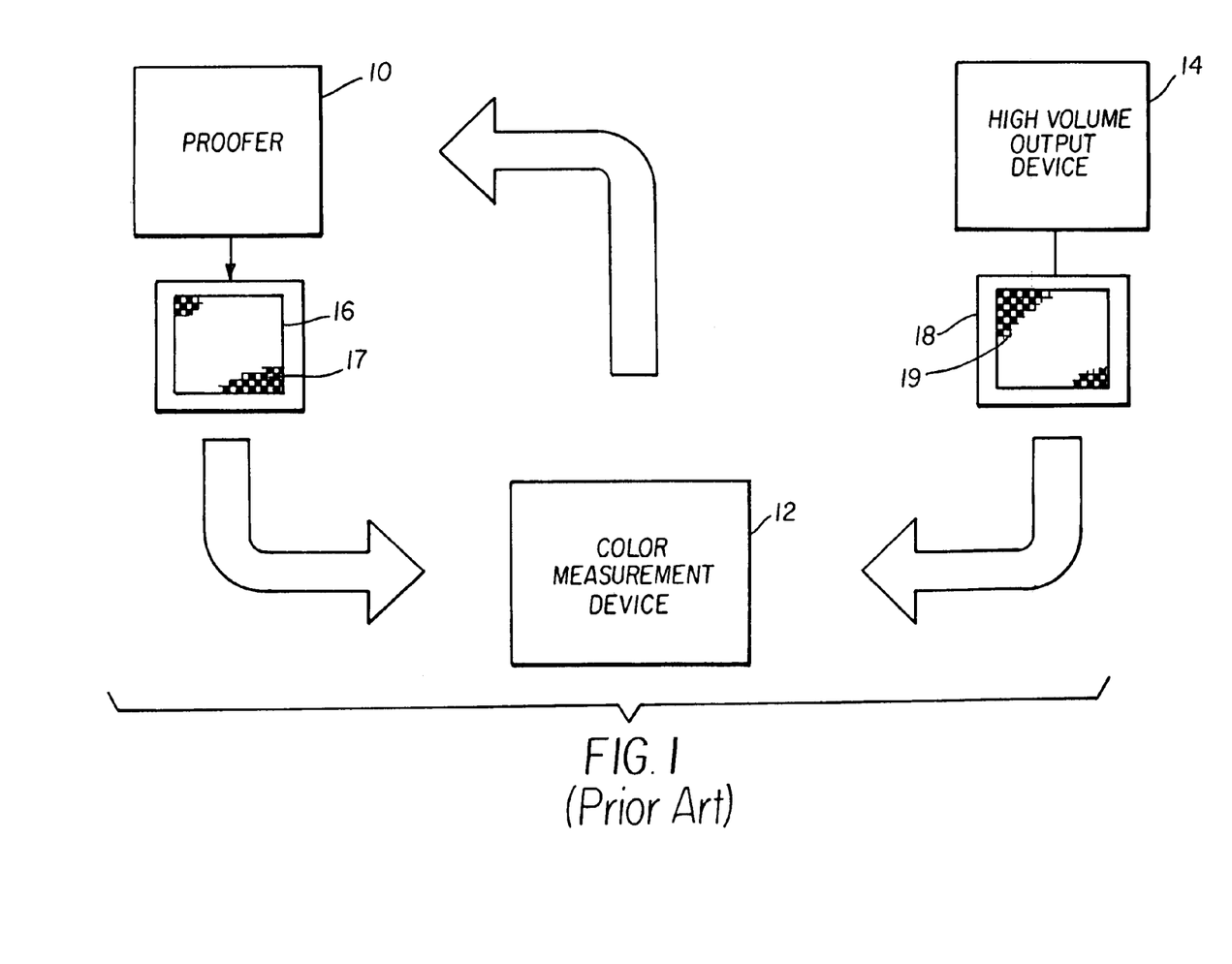
FIG. 1 shows a drawing of the proofing process using a stand-alone color measurement device according to the prior art.

FIG. 1 shows a drawing of the proofing process using a stand-alone color measurement device according to the prior art. The process of making calibration adjustments to the proofer 10 begins when the proofer 10 renders a calibration test image 16. Calibration test image 16 contains a multiplicity of color patches 17. Each of color patches 17 contains the color printed by proofer 10 in response to a particular color code value. The color content of the color patches 17 of test image 16 are measured using stand alone color measurement device 12. The color measurements are compared to the code values associated with the color patches 17. A set of calibration adjustments is determined using these comparisons. The operation of the stand-alone proofer 10 is then adjusted so that the stand-alone proofer 10 renders a proof having the colors called for in the color code values for the proof.

The process of making color measurement adjustments to proofer 10 begins by obtaining a characterization test image 18. Characterization test image 18 is printed by high volume output device 14 or otherwise printed in accordance with a standard color proofing system such as MatchPrint ™. Characterization test image 18 also contains a set of color patches 19. Each of color patches 19 is associated with a color code value. The location of each of patches 19 on characterization test image 18 are defined by convention or by an industry standard e.g. American National Standards Institute standard IT8.7/3.

Characterization test image 18 is submitted to color measurement device 12. The color content of color patches 19 are measured and compared to the color code values associated with color patches 19. Comparison of the color code values to the colors printed in color patches 19 forms the foundation for building a mathematical model that predicts the color that high volume device 14 will print as a function of input code values. This mathematical model is inverted to allow prediction of image code values as a function of colorimetric values. These two mathematical models relating code values to the color output of high volume output device 14 comprise the primary elements in what is known as a device profile. The device profile for high volume output device 14 is used to adjust proofer 10 to convert the code values in the image to be proofed into modified code values. Proofer 10 prints the proof using the modified code values.

It will be appreciated that substantial operator involvement is required to make calibration and color management adjustments using the stand alone devices. For example, an operator using a stand-alone color measurement device 12 is required to cause the high volume output device 14 to print test image 18. The operator must then wait for the test image 18 to be printed and convey test image 18 from the high volume output device 14 to the stand-alone color measurement device 12. The operator must then insert the characterization test image 18 into the color management device 12 to initiate the color measurement. Then the operator must wait for stand-alone color measurement device 12 to complete making the color measurements. Finally, the operator must adjust proofer 10 using the information from stand-alone color management device 12 to determine the adjustments that must be made to the proofer and to make those adjustments.

Figure 2:
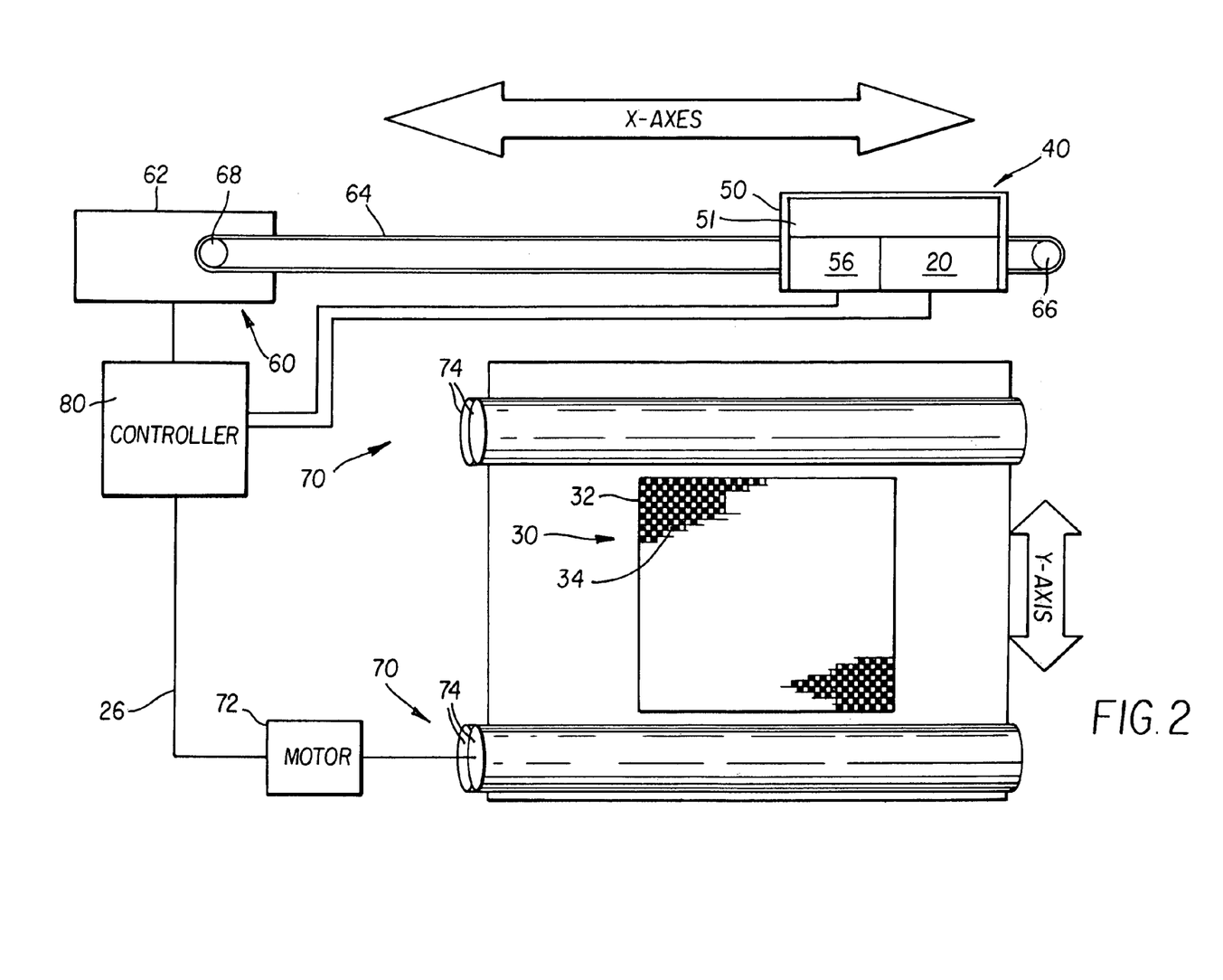
FIG. 2 shows a schematic diagram of a proofer of the present invention.

FIG. 2 shows a proofer 26 according to a preferred embodiment of the present invention. Proofer 26 comprises a proofing head 50 having a color light analyzer 20, a color printhead 56 and a housing 40 which joins light analyzer 20 to printhead 56. Printhead 56 may use any of several known technologies, such as, for example, ink jet, laser, impact, etc.

Figure 3:
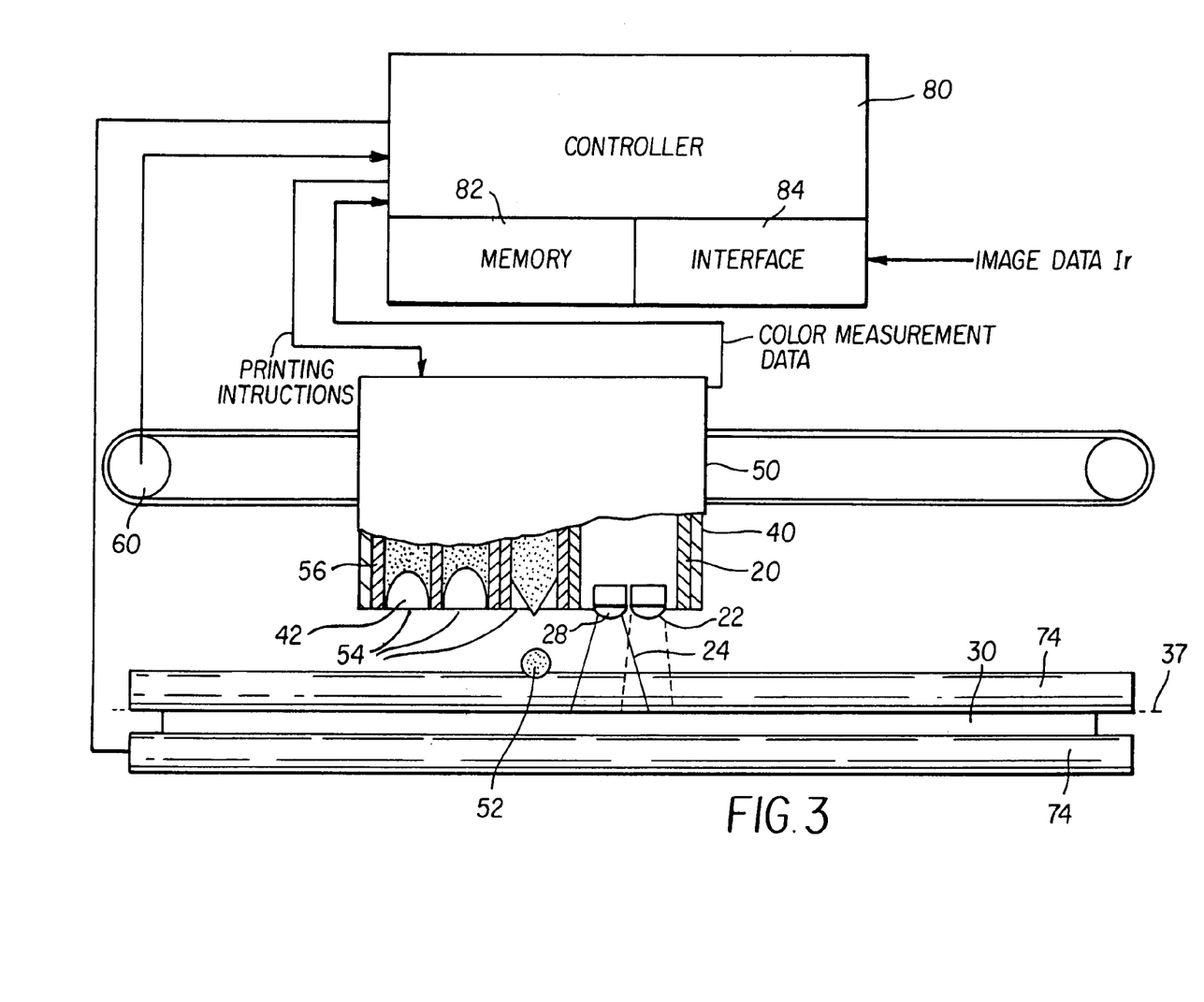
FIG. 3 shows an expanded view of the proofer of FIG. 1 with various components exhibited in cross section.

Housing 40 can comprise any of a box, closed frame, continuous surface or any other enclosure defining an interior chamber 41. In the embodiment of FIGS. 2 and 3, housing 40 comprises a housing that holds both color light analyzer 20 and printhead 56. Housing 40 directs printhead 56 so that a donor material such as an ink 52 ejected by printhead 56 is directed onto media 30. Housing 40 also directs the light analyzer 20 so that it receives light reflected by media 30.

The proofing head 50 is advanced along an X-axis by a translation unit 60. In the embodiment shown in FIG. 2, translation unit 60 comprises a motor 62 and a belt 64. Belt 64 is aligned along an X-axis relative to the media and supported at one end by a freely rotating support pinion 66 and a drive pinion 68. Drive pinion 68 is operated by motor 62. Housing 40 of proofing head 50 is fixed to belt 64 and moves in accordance with the motion of belt 64. Y-axis displacement of media 30 relative to proofing head 50 is provided by media advance 70. Media advance 70 can comprise any number of well-known systems for moving media 30 within a printer including but not limited to a motor 72 driving pinch rollers 74, a motorized platen roller (not shown). Of course, other mechanical arrangements may be used to provide relative translation of proofing head 50 and media 30.

A controller 80 is provided and, as will be discussed in greater detail below, controller 80 drives the operation of printhead 56, light analyzer 20, translation unit 60, and media advance 70 during calibration, color management and printing operations. Controller 80 can comprise any of a programmable digital computer, a programmable logic controller, a series of electronic circuits or a series of electronic circuits reduced to the form of an integrated circuit.

FIG. 3 shows another view of proofer 26 with proofing head 50 shown in partial cross section. As is seen in this view, housing 40 comprises an interior chamber 41 that contains both color light analyzer 20 and printhead 56. An opening 42 in housing 40 permits ink 52 to flow from printhead 50 during printing operations to form an image on a media 30 positioned in a media plane 37.

Opening 42 in housing 40 also permits light to pass between a media 30 positioned in a media plane 37 and color light analyzer 20 during color management and calibration operations. In one embodiment, housing 40 directs the printhead 56 so that ink ejected by the print head flows onto one portion of a media. In this embodiment, the housing 40 directs the color light analyzer to collect light reflected by a second portion of the media 30. The first portion is adjacent to the second portion. However, in an alternative embodiment the first and second portion are separate.

Printhead 56 preferably comprises ink jet nozzles 54 for ejecting colored ink droplets 52 onto media 30. In such a design, colored ink is supplied to the printhead 50 by a suitable reservoir (not shown). Printhead 56 may be caused to eject droplets of ink 52 by a thermal mechanism or by an electro-mechanical mechanism. Printhead 56 may also use continuous ink flow technology.

Color light analyzer 20 preferably includes a light source 22 that emits a light beam 24 having a known spectral composition. Light beam 24 is directed at media 30 and is reflected by the media. Color light analyzer 20 receives the reflected light via sensor 28. The color content of the reflected light is then measured and a signal representing the color content is transmitted from color light analyzer 20 to controller 80. The color light analyzer 20 can be a densitometer, calorimeter, color scanner or spectrophotometer. In the embodiment of FIG. 3, color light analyzer 20 comprises a spectrophotometer.

The process of making calibration and color management adjustments to proofer 26 will now be described with reference to FIGS. 2 and 3.

In the first step of the calibration process, controller 80 causes media advance 70 to position media 30 into position for printing. Controller 80 then accesses an electronic representation of a test image used for calibration. This electronic representation is stored in a controller memory 82. This electronic representation contains particular code values defining the colors to be printed at particular X-Y positions on media 30 to form test image 32. Alternatively, the electronic representation of test image 32 to be used for calibration can be stored on a device such as a data disk (not shown) or a computer network (not shown) and accessed by way of communication interface 84. Controller 80 positions printhead 56 at particular X-Y coordinates on media 30 by the action of translation unit 60 and media advance 70. The controller 80 causes printhead 56 to eject ink droplets 52 to form the color patches 34 on the test image 32 in accordance with the code values in the electronic representation of the calibration test image 32.

In the second step of the calibration process, controller 80 actuates the media advance 70 and translation unit 60 so that the color light analyzer 20 can scan each of the color patches 34. The color light analyzer 20 measures the spectral reflectance of each of the patches 34. Controller 80 receives the measurement data from each of the color patches 34. Controller memory 82 contains code values associated with each of the patches of the characterization test image. Controller 80 then compares the color measured at each of patches 34 against the color code values associated with each of patches 34. From this comparison controller 80 then determines the adjustments that must be made to cause printhead 56 to generate a particular color on media 30. Controller 80 then makes the calibration adjustments so that the printhead 56 renders images having the colors associated with the code values for the images.

Color management adjustments are made to the operation of proofer 26 using a characterization test image (not shown). The characterization test image can be printed by the high volume output device or printed in accordance with a standard color proofing system. In either case, the characterization test image contains a number of color patches with each patch associated with a particular code value. The characterization test image is inserted into the media advance 70. Controller 80 then advances the color light analyzer 20 to each of the color patches and measures the color of each patch.

Controller memory 82 contains code values associated with each of the patches of the characterization test image. The colors measured at each of the patches by color light analyzer 20 are transmitted to controller 80 and compared to the code values associated with the patches. Controller 80 uses these comparisons to build a device profile that predicts how the high volume output device will convert code values to colors on a printed image. Controller 80 then makes the color management adjustments in accordance with the profile.

To print the proof using proofer 26, the data representing an image, Ir, to be proofed is provided to interface 84 which converts this data into a form that is usable by controller 80. Controller 80 receives this data and modifies this data to reflect calibration adjustments and profile adjustments. Controller 80 then transmits printing instructions to the printhead 56 in accordance with the adjusted data so that so that an image printed by the printhead 56 will visually match the appearance of the same image as printed the high volume output device.

It will be understood that it is also possible to accomplish the same result by using the calibration data and color adjustments to modify the way in which controller 80 transforms color code values into printing instructions or by using calibration and color management adjustments to modify the way in which the printhead 56 transforms printing instructions into the release of ink 52.

It will also be understood that the time required to perform color calibration measurements can be reduced by using color light analyzer 20 to measure the color patches 34 of test image 32 during the printing of test image 32.

Accordingly, both calibration and characterization of the proofer 26 is accomplished in the present invention with greatly reduced operator involvement and equipment cost as compared to the stand-alone color proofer arrangement of FIG. 1.

Figure 4:
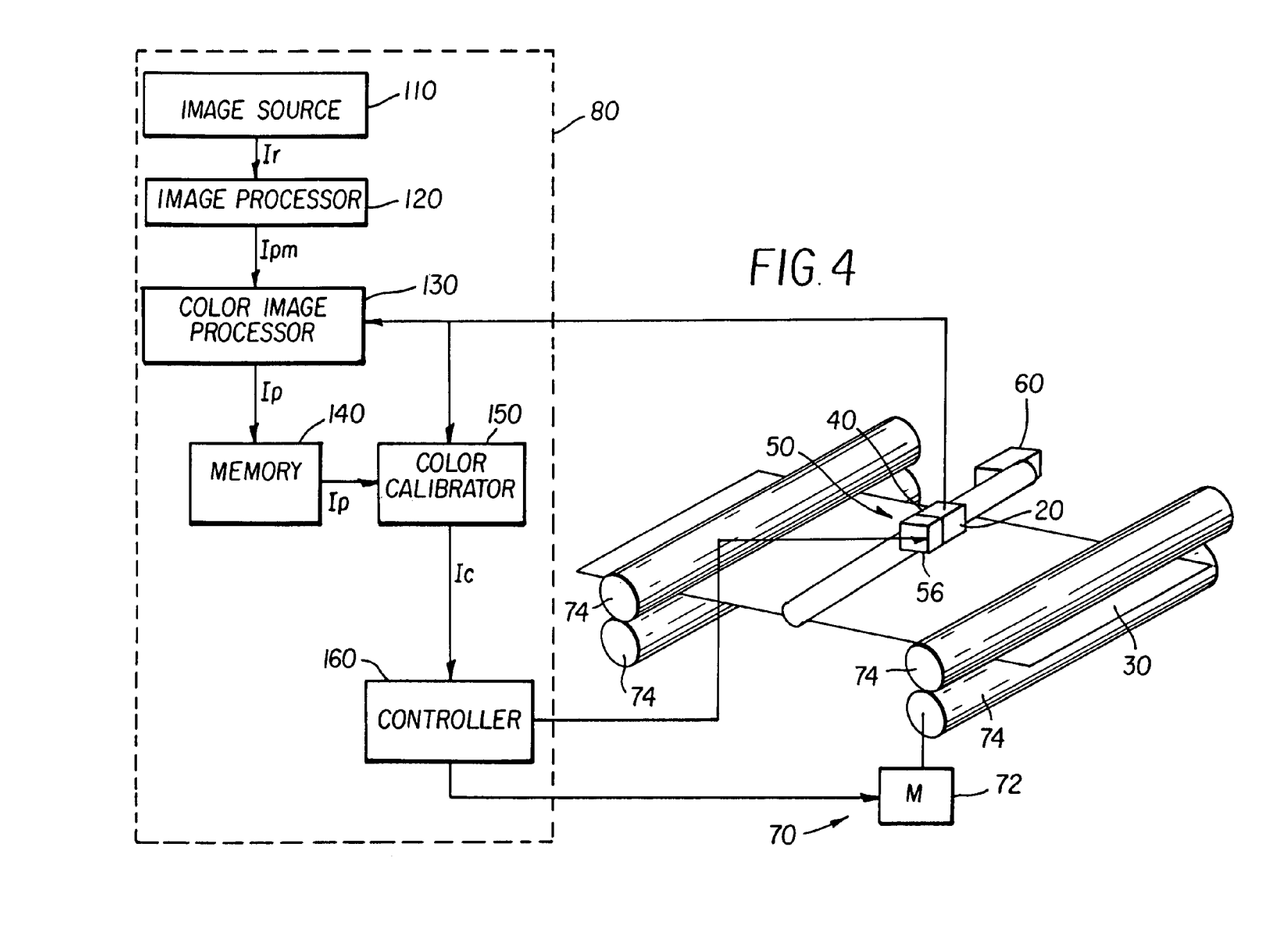
FIG. 4 shows a detailed view of a portion of the proofer of FIGS. 2 and 3.

FIG. 4 shows a detailed embodiment of controller 80 of the present invention. In this embodiment, independent processors are used for image processing (120), color management (130), calibration (150), and control purposes (160). Each of the independent processors of FIG. 4 can comprise any of a programmable digital computer, a programmable logic controller, a series of electronic circuits or a series of electronic circuits reduced to the form of an integrated circuit. It will readily be understood that it is possible to practice the present invention using other combinations of processors and electrical circuits to perform the required functions.

In the embodiment of FIG. 4, a media advance 70 and translation unit 80, as generally described above, are provided for maneuvering proofing head 50 and media 30. Controller 160 operates media advance 70 and translation unit 60 to position the proofing head 50 at particular X-Y co-ordinates relative to media 30.

To make calibration adjustments, a test image 32 is generated by the proofer 26. Controller 160 maneuvers color light analyzer 20 into position to measure the color content of the color patches 34 of calibration test image 32. The measurements are provided to a color calibrator 150. Color calibrator 150 calculates color density at particular patches 34 and compares these densities to the color densities that the printhead 56 was instructed to print. From this, the color calibrator 150 generates a calibration look up table (CaLUT). The CaLUT correlates color code values in the electronic image data to the color code values that must actually be used during printing to cause the printhead 56 to generate the desired colors in the printed image. During printing, color calibrator 150 modifies the code values in the data representing the image to be printed in accordance with the CaLUT.

To make color management adjustments, a characterization test image (not shown) having color patches printed by the high volume output device or printed in accordance with an industry standard, is inserted into the media advance 70. Controller 160 causes media translation unit 60 to color light analyzer 20 into positions to measure color content of the color patches of the characterization test image. The measurements are provided to color image processor 130. Color image processor 130 generates a color profile of the data measured from the test image using one or more profiling techniques known in the art. Examples of software embodying these techniques include CompassProFile ™ software sold by Color Savvy Systems, Ltd. of Springboro, Ohio, and KODAK COLORFLOW ICC Profile Editor sold by Eastman Kodak Company of Rochester, N.Y. The profile takes the form of a three or four dimensional Look Up Table (ChLUT), depending upon the number of color channels in the image. The color image processor 130 can comprise a trilinear or quadlinear interpolation processor (not shown) to modify the color code values in the electronic data representing an image in accordance with the ChLUT.

During proofing operations, electronic data representing the image to be proofed is transmitted to the proofer 26. This data, Ir, is accepted by the proofer 26 by way of an image source 110. Image source 110 can comprise any convenient interface for accepting Ir from an external source and making Ir available for processing and printing by the proofer 26. Image source 110 can include systems for receiving and decoding magnetic or optical disk drives and flash memory cards. Image source 110 can also include systems for receiving electronic signals from computers, computer networks, and other devices. These signals may take the form of raster image data, outline image data in the form of a page description language or other forms of digital representation.

Image source 110 is coupled to an image processor 120 that converts the image data Ir from image source 110 into a pixel-mapped page image Ipm. Color image processor 130 processes the pixel-mapped image Ipm, using the ChLUT to form a processed image Ip. This modifies the image, Ip, so that the color gamut and tone characteristics of the code values in the processed image Ip match the color gamut and tone characteristics of the output of the high volume output device that has been profiled. After processing, the processed image Ip is stored in memory 140 until the processed image, Ip, is needed for printing.

To print the proof, processed image Ip is fed from memory 140 to previously mentioned calibrator 150. Calibrator 150 modifies the processed image Ip using the CaLUT to produce a calibrated image Ic. This calibrated image Ic is then fed to the printer controller 160. Printer controller 160 determines, from this data, the colors to be used in the image, and where these colors are to be deposited on a receiver media 30. Controller 160 advances the printhead 56 and media 30 to any X-Y coordinate by operation of the translation unit 60 and media advance 70. Printer controller 160 then applies a time-varying electrical pulse to the printhead 56 to eject a combination of ink droplets 52 from printhead 56 in accordance with the calibrated image Ic.

The proofer 26 of FIG. 4, therefore, modifies image data twice before printing: once to ensure that the colors of the printed image properly reflect the calorimetric characteristics of a high volume output device and once to ensure that the printhead 56 creates the desired colors on a particular receiver media 30.

It will also be appreciated that proofer 26 can be configured to automatically execute both calibration adjustments and color management adjustments with a minimum of operator involvement. In the system shown in FIG. 5, the media advance 70 can be supplied by a media supply source such as a tray 78. Tray 78 is configured to contain more than one sheet of media 30, and to supply the media 30 to the media advance 70 in an orderly fashion. With this arrangement, a user can insert a receiver media 30 and a second media 31 having a test image 33 printed by a high volume output device into the tray 78. Controller 80 is programmed to execute both calibration and color management adjustments using these images. After calibration and color management adjustments, the proofer 26 is ready to generate a visually accurate proof.

Figure 5:
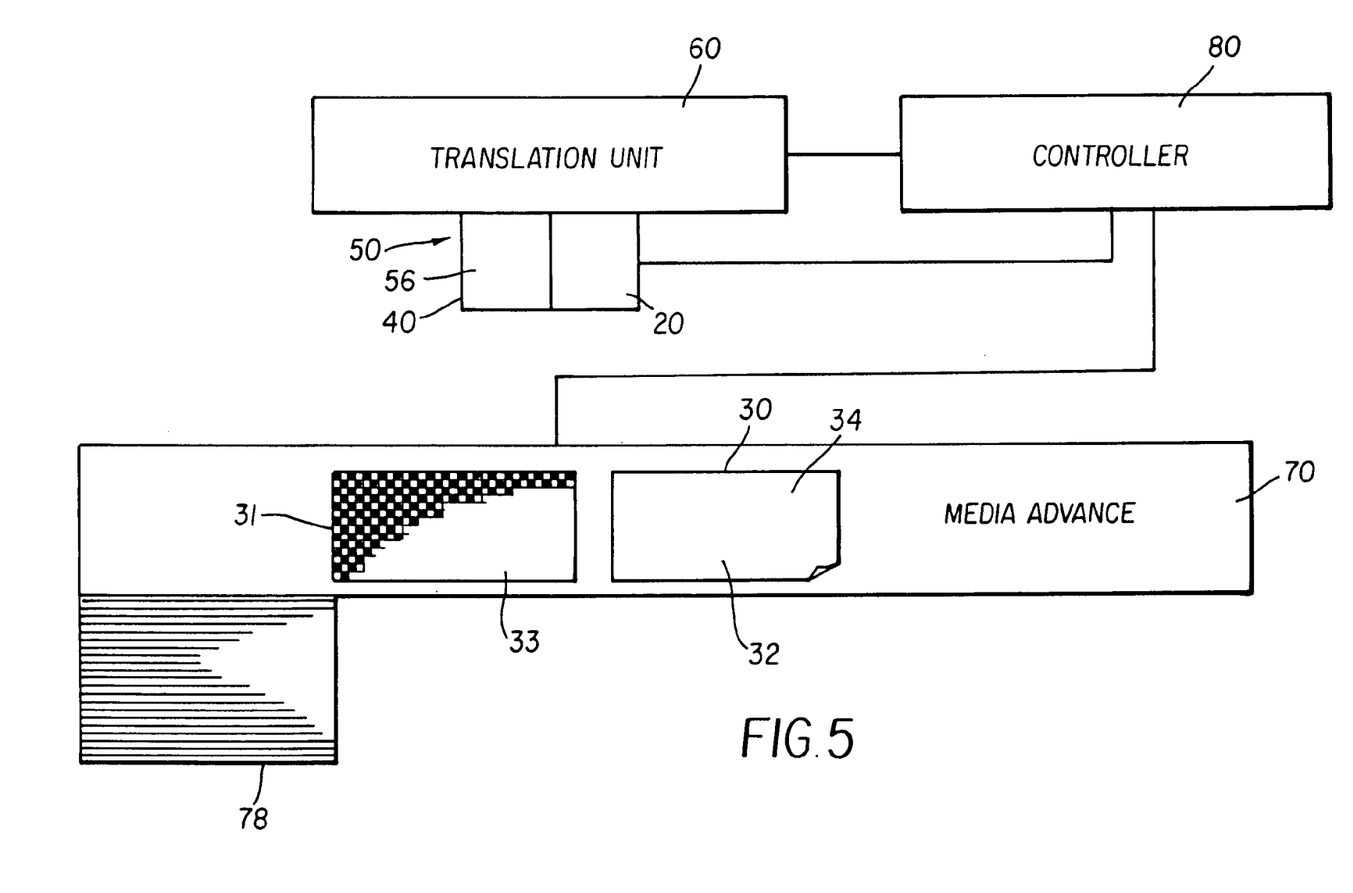
FIG. 5 shows a diagram of another embodiment of the present invention.

It will be understood that printing conditions can change during the printing of the proof. These changes can alter the color content of an image printed by printhead 56 on a receiver media 30. To prevent this, proofer 26 of the present invention can be configured so that the light reflecting from colors printed by printhead 56 on a media 30 is measured by the color light analyzer 20 during printing. Controller 80 can then make printer calibration adjustments in response to real-time color measurements.

It will also be understood that circumstances may arise wherein the printhead 56 cannot be made to print the desired colors on the media 30. For example, this can occur because a supply of an ink is exhausted or because the printhead 56 is clogged or damaged. In such circumstances, no adjustment of the calibration can compensate for the problem, thus, controller 80 can be programmed to stop printing or to provide the user with a warning that calibration errors occurred during printing. This warning can comprise a written warning printed on the image, an interruption of the printing process or other forms of aural or visual notification.

Figure 6:
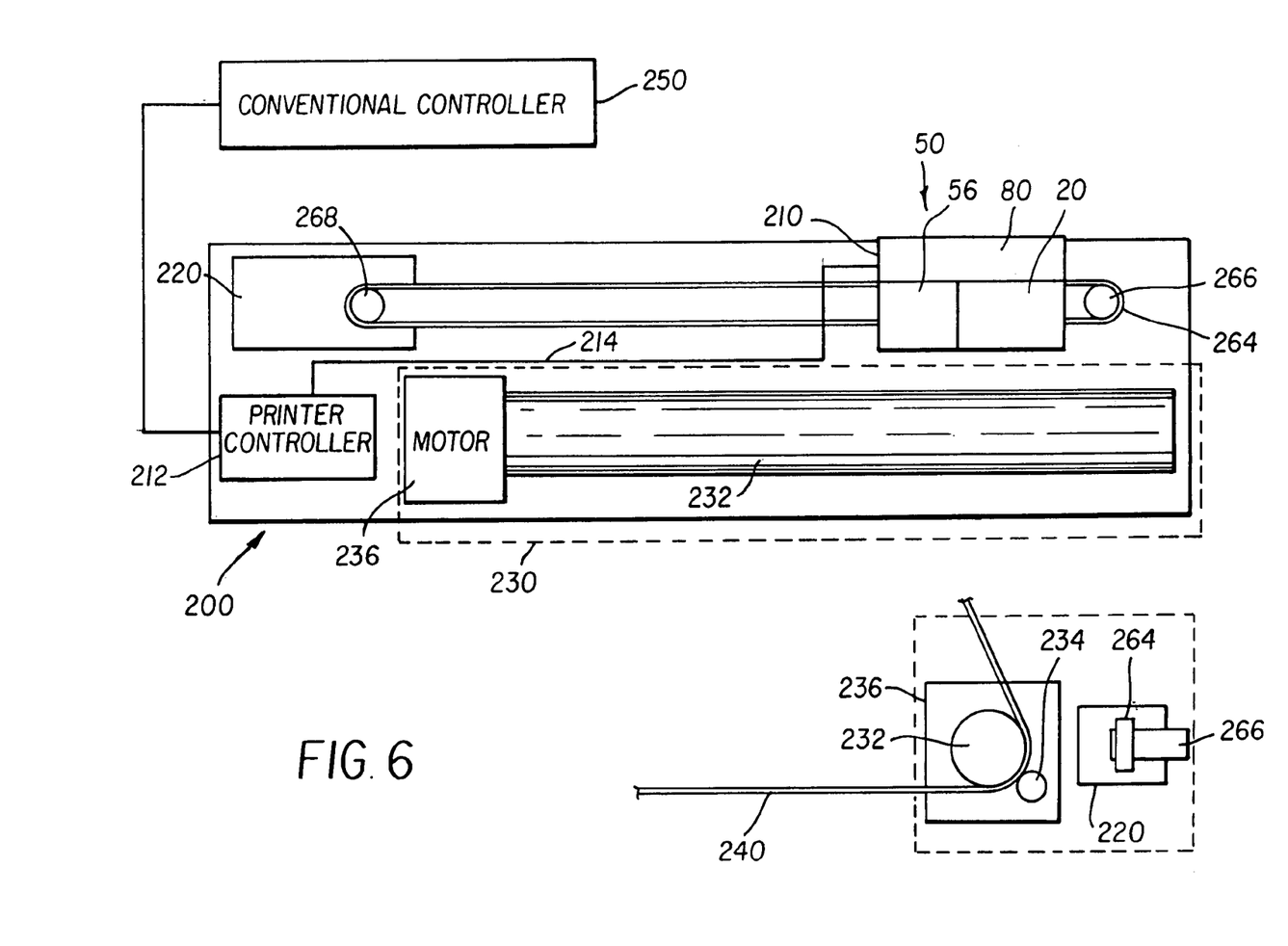
FIG. 6 shows an embodiment of the proofing head of the present invention for use with a conventional printer.

As is shown in FIG. 6, one particularly valuable application of the proofing head 50 of the present invention is for a proofing head 50 that can be installed into a conventional printer 200, having a predefined printhead mounting area 210. Printer controller 212 controls the operation of printer media advance 230 and printhead translation unit 220. An electrical connection 214 is also defined between printer controller 212 and printhead mounting area 210 to allow the printer controller 212 to govern the operation of a conventional printhead to 216 (not shown). Media advance 230 comprises a media roller 232 and pinch roller 234. A motor 236 drives the operation of roller 232 to advance a sheet of media 240 along a Y-axis. Translation unit 220 can movably position the mounting area 210 relative to the media along an X-axis by rotating drive pinion 268 to drive belt 264 and pinion 266. The printer 200 operates as does any conventional printer and, does not have any inherent structure for performing calibration or characterization operations.

Proofing head 50 is installed in the predefined printhead mounting area 210. To accommodate this, housing 40 is shaped to fit into printhead mounting area 210. In this embodiment, housing 40 comprises an inner chamber 41 that contains controller 80, printhead 56 and color light analyzer 20. In this embodiment, the controller 80 is electrically connected to controller 212 by way of the electrical connection 214. In this manner, the printing instructions transmitted by the printer controller 212 are received by the controller 80 of the proofing head 52.

Once installed into the printhead mounting area 210, proofing head 50 is used to execute printer calibration and characterization adjustments. In this respect, controller 80 of proofing head 50 is connected to printer controller 212 to cause printer controller 212 to operate translation unit 220 and media advance 230 to allow for the creation of a calibration test image and to allow for the color measurement of calibration and characterization test images as generally described above. Alternatively, printer 200 can be connected to an external computer 250, which directs printer controller 212 to maneuver proofing head 50 to particular locations in order to allow the proofer to perform calibration and characterization operations, as generally described above.

During printing, the printer controller 212 transmits printing instructions to controller 80. Controller 80 modifies the printing instructions in accordance with color calibration and color management adjustments so that an image printed by printer 200 will have the same visual appearance as the same image when printed by a high volume printer or output device. In one embodiment of the present invention, controller 80 uses color light analyzer 20 to ensure that the colors that are printed by printhead 56 onto a media 240 during printing match the colors that the controller 80 has instructed the printhead 56 to print. If these colors do not match, controller 80 modifies the operation of the printhead 56.

Thus, as is shown and described, the proofing head 56 can be incorporated into a conventional printer to provide calibration and proofing capabilities to such a printer 210 without substantial modification to the existing printer design.

The invention has been described in detail with particular reference to certain preferred embodiments thereof, but it will be understood that variations and modifications can be effected within the spirit and scope of the invention.

PARTS LIST 10 stand-alone proofer
12 stand-alone color measurement device
14 high volume output device
16 calibration test image
17 color patches
18 characterization test image
19 color patches
20 color light analyzer
22 light source
24 light beam
26 proofer
28 sensor
30 media
31 second Media
32 calibration test image
33 characterization test image
34 color patches
37 media plane 40 housing
42 opening in housing
50 proofing head
52 ink
56 printhead
60 translation unit
62 motor
64 belt
66 support pinion
68 drive pinion
70 media advance
72 motor
74 pinch rollers
76 media supply source
78 tray
80 controller
82 controller memory
84 controller interface
110 image source
120 image processor
130 color image processor
140 image memory
150 color calibrator
160 printhead controller
200 conventional printer
210 predefined printhead mounting area
212 printer controller
214 electrical connection
216 conventional printhead
220 translation unit
230 media advance
232 media roller
234 pinch roller
236 motor
250 conventional computer
264 belt
266 support pinion
268 drive pinion

What is claimed is:

1. A proofing head assembly comprising:
   a) a color light analyzer;
   b) a color printhead;
   c) a housing joining the printhead to the color light analyzer and directing the printhead and color light analyzer at a media plane and
   d) a controller to operate the color light analyzer to make color measurements of an image and to instruct the printhead to render images on a receiver media;
   wherein said controller calculates color adjustments using color measurement data from said color light analyzer and adjusts the colors printed by the printhead to match the visual appearance of an image printed by the printhead to the appearance of the same image as printed by another printer.

2. A proofing head assembly as claimed in claim 1, wherein said controller calculates color adjustments by comparing color data measured from a printed image to baseline color data.

3. A proofing head assembly as claimed in claim 1, wherein said controller instructs the printhead to print a color having known image code values and said color light analyzer to measure the color printed by the printhead in response to said image code values and to adjust the operation of the printhead based upon the measured colors.

4. A proofing head assembly as claimed in claim 1 wherein said controller uses said color light analyzer to measure the colors printed by the printhead on a receiver media to verify that the colors printed on the receiver media visually match the instructions sent to the printhead.

5. A proofing head assembly as claimed in claim 1 wherein said controller compares the color data measured from an image during the printing of an image to the colors that the printhead was instructed to render and provides a signal if the comparison indicates that the colors do not match.

6. A proofing head assembly as claimed in claim 1, wherein said controller adjusts the operation of the printhead during printing operations to cause the colors in the printed image to conform to the colors that the printhead was instructed to print.

7. A proofing head assembly as claimed in claim 1, wherein said controller receives data representing an image to be printed and converts this data into printing instructions for the printhead that are modified in accordance with color calibration and characterization adjustments.

8. A proofing head assembly as claimed in claim 7, wherein said controller further comprises a color calibrator to compare the color values measured from a test image printed by the printhead to known color values associated with the test image and to determine calibration adjustments based on this comparison.

9. A proofing head assembly as claimed in claim 7, wherein said controller further comprises a color processor to compare the color values measured from a test image printed by another device to known color values associated with the test image and to determine characterization adjustments based on this comparison.

10. A proofing head assembly as claimed in claim 7, wherein said controller further comprises a color calibrator to receive color measurement data from the light analyzer at particular locations on a calibration test image printed by the printhead and to calculate calibration adjustments by comparing the color values measured at a particular location of a test image printed by the printhead to known color values associated with that location on the test image.

11. A proofing head assembly as claimed in claim 7, wherein said controller further comprises a color processor to receive color measurement data from the light analyzer at particular locations on a characterization test image printed by another device and to calculate characterization adjustments by comparing the color values measured at a particular location of a test image printed by another device to known color values associated with that location on the test image.

12. The print head of claim 1, wherein said housing comprises a closed frame.

13. The proofing head of claim 12, wherein said housing has an interior chamber to contain the printhead and the color light analyzer and further comprises an opening to permit ink from the printhead to pass to the outside of the housing and to further permit light to pass to the color light analyzer.

14. The proofing head of claim 12, wherein said housing defines a cavity for containing said printhead, said controller, and said color light analyzer, and said cavity defines an opening to permit ink to pass from the printhead onto a media and said cavity further permits light to pass between the color light analyzer and the media.

15. The printhead of claim 14, wherein said housing rigidly joins said color light analyzer and said color printhead.

16. A proofing head assembly comprising:
a) a spectrophotometer;
b) a color printhead; and
c) a controller;
wherein said spectrophotometer, said color printhead and said controller are joined to form an integral assembly wherein said controller calculates color adjustments using color measurement data from said color light analyzer and adjusts the colors printed by the printhead to match the visual appearance of an image printed by the printhead to the appearance of the same image as printed by another printer.

17. The proofing head assembly of claim 16, wherein said printhead, said controller and said spectrophotometer are rigidly joined to form an integral assembly.

18. A proofing printer assembly for proofing an encoded image, said proofing printer comprising:
a proofing head having a color light analyzer and a color printhead joined by a housing that directs the printhead and color light analyzer at a media;
a media advance to position the media relative to the proofing head assembly;
a controller to operate the proofing head assembly, the translation mechanism and the media advance; and
a controller operable to drive the color light analyzer to make color measurements of an image and to instruct the printhead to render images on a receiver media;
wherein said controller calculates color adjustments using color measurement data from said color light analyzer and adjusts the colors printed by the printhead to match to visual appearance of an image printed by the printhead to the appearance of the same image as printed by another printer.

19. A proofing printer assembly as claimed in claim 18, wherein said controller calculates color adjustments by comparing color data measured from a printed image to baseline color data.

20. A proofing printer assembly as claimed in claim 18, wherein said controller instructs the printhead to print an image having known image code values and measures the colors printed by the printhead in response to said code values and to adjust the operation of the printhead while the image is printing.

21. A proofing printer assembly as claimed in claim 18, wherein said controller uses said spectrophotometer to measure the colors printed by the printhead on a receiver media to verify that the colors printed on the media visually match the color printing instructions sent to the printhead.

22. A proofing printer assembly as claimed in claim 18, wherein said controller compares the color data measured from an image during the printing of an image to the colors that the printhead was instructed to render and provides a signal if the comparison indicates that the colors do not match.

23. A proofing printer assembly as claimed in claim 18, wherein said controller adjusts the operation of the printhead during printing operations to cause the colors in the printed image to conform to the colors that the printhead was instructed to print.

24. A proofing printer assembly as claimed in claim 18, wherein said controller receives data representing an image to be printed and converts this data into printing instructions for the printhead that are modified in accordance with color calibration and characterization adjustments.

\* \* \* \* \*

UNITED STATES PATENT AND TRADEMARK OFFICE
CERTIFICATE OF CORRECTION

PATENT NO. : 7,097,269 B2 Page 1 of 1
APPLICATION NO. : 09/736049
DATED : August 29, 2006
INVENTOR(S) : Robert P. Collette et al.

It is certified that error appears in the above-identified patent and that said Letters Patent is hereby corrected as shown below:

Claim 12, column 12, line 50 Replace "print head" with --proofing head--
Claim 15, column 12, line 65 Replace "printhead" with --proofing head--

Signed and Sealed this

Nineteenth Day of December, 2006

JON W. DUDAS
*Director of the United States Patent and Trademark Office*